(12) United States Patent
Antaki

(10) Patent No.: US 8,363,028 B2
(45) Date of Patent: *Jan. 29, 2013

(54) FLEXIBLE FINGERPRINT SENSOR

(76) Inventor: Patrick R. Antaki, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,965

(22) Filed: Jul. 26, 2012

(65) Prior Publication Data

US 2012/0299821 A1 Nov. 29, 2012

Related U.S. Application Data

(63) Continuation of application No. 11/877,662, filed on Oct. 23, 2007, now Pat. No. 8,253,696.

(60) Provisional application No. 60/853,796, filed on Oct. 23, 2006.

(51) Int. Cl.
*G06F 3/041* (2006.01)

(52) U.S. Cl. .................................................. 345/173

(58) Field of Classification Search ................. 345/173; 73/780, 862.68, 818; 178/18.06
See application file for complete search history.

(56) References Cited

U.S. PATENT DOCUMENTS

| | | | |
|---|---|---|---|
| 4,353,056 A | 10/1982 | Tsikos | |
| 4,394,773 A | 7/1983 | Ruell | |
| 4,644,101 A | 2/1987 | Jin et al. | |
| 4,856,993 A | 8/1989 | Maness et al. | |
| 5,033,291 A | 7/1991 | Podoloff et al. | |
| 5,060,527 A * | 10/1991 | Burgess | 73/862.68 |
| 5,515,738 A | 5/1996 | Tamori | |
| 6,512,381 B2 | 1/2003 | Kramer | |
| 6,580,816 B2 | 6/2003 | Kramer et al. | |
| 6,680,485 B1 | 1/2004 | Carey et al. | |
| 6,856,383 B1 | 2/2005 | Vachris et al. | |
| 6,915,701 B1 | 7/2005 | Tarler | |
| 6,964,205 B2 | 11/2005 | Papkostas et al. | |
| 7,021,158 B2 | 4/2006 | Shimizu et al. | |
| 7,059,203 B2 | 6/2006 | Asai et al. | |
| 7,077,010 B2 | 7/2006 | Ganapathi | |
| 7,080,562 B2 * | 7/2006 | Knowles et al. | 73/818 |
| 7,248,298 B2 | 7/2007 | Lee | |
| 7,250,774 B2 | 7/2007 | Oka | |
| 7,258,026 B2 | 8/2007 | Papkostas et al. | |
| 7,260,999 B2 | 8/2007 | Divigalpitiya et al. | |
| 2005/0005703 A1 * | 1/2005 | Saito et al. | 73/780 |
| 2006/0273417 A1 | 12/2006 | Ganapathi et al. | |

OTHER PUBLICATIONS

International Search Report and Written Opinion for PCT/US2007/082309 dated Sep. 10, 2008.

* cited by examiner

*Primary Examiner* — Kevin M Nguyen
*Assistant Examiner* — Cory Almeida
(74) *Attorney, Agent, or Firm* — Daniel J. Chalker; Edwin S. Flores; Chalker Flores, LLP

(57) ABSTRACT

A flexible pressure sensor has a first set of substantially parallel conductors in the x direction, a second set of substantially parallel conductors in the y direction, and a composite material disposed between the first set and second set of conductors. The composite material is capable of returning to substantially its original dimensions on release of pressure. The composite material includes conductive particles at least partially embedded in an elastomeric layer that have no relative orientation and are disposed within the elastomeric layer for electrically connecting the first set and second set of conductors in the z direction under application of sufficient pressure there between.

44 Claims, 9 Drawing Sheets

FLEXIBLE FINGERPRINT SENSOR

PRIORITY CLAIM AND CROSS-REFERENCE
TO RELATED APPLICATIONS

This patent application is continuation application of U.S. patent application Ser. No. 11/877,662 filed on Oct. 23, 2007 and entitled "Flexible Fingerprint Sensor", which is a non-provisional application of U.S. provisional patent application Ser. No. 60/853,796 filed on Oct. 23, 2006 and entitled "Flexible Fingerprint Sensor." This patent application is also related to PCT patent application number PCT/US2007/082309 filed on Oct. 23, 2007 and entitled "Flexible Fingerprint Sensor." All of the foregoing patent applications are hereby incorporated by reference in their entirety.

FIELD OF THE INVENTION

The present invention relates generally to the field of pressure sensors and, more particularly, to a flexible fingerprint sensor.

BACKGROUND OF THE INVENTION

The events of Sep. 11, 2001 and the explosion in "identity theft" have raised the need for reliable personal identification. There exists a need in society to positively identify, or at least, to authenticate a person's identity in the course carrying out certain transactions. These transactions range from purchasing items with a credit card to boarding commercial airplanes. This need is currently met superficially through looking at someone's driver's license, asking for a simple PIN code, and other similar but inadequate means. A more reliable means is to use a biometric identifier as one criterion to authorize the transaction.

Recently, a slew of biometric identification methods have been proposed, including iris scans, DNA matching, heartbeat patterns, and many other esoteric approaches. On the other hand, the human fingerprint has been an accepted method for identification and matching of persons for well over 100 years, and has withstood the test of time through numerous legal and court cases. In order for fingerprint identification to be widely used on hand-held devices, credit and debit cards, and identification badges and cards, the fingerprint sensor must be low cost, thin, mechanically conforming, mechanically flexible, and provide adequate resolution. Prior art fingerprint sensors fail to satisfy all of these requirements as evidenced by the lack of fingerprint sensors on commercially produced hand-held devices, credit and debit cards, and identification badges and cards.

There are several methods for capturing fingerprints: physical (inkpads), optical, electronic optical scan, capacitive and specialized materials. The inkpad method is the oldest method whereby the finger's pattern is transferred to a paper record using ink and finger pressure. The optical method uses a film or electronic camera to capture an optical image of the fingerprint. This is typically used in criminal investigations to document latent fingerprints from a crime scene. The electronic optical scan method involves the scanning of a fingerprint through its reflection of light, which is transferred directly from the subject finger to the opto-electronic sensor. This method has been in use in numerous government applications, including the issuance of drivers' licenses. These sensors must be flat and rigid. As a result, they are not suitable for use on most hand-held devices, credit and debit cards, and identification badges and cards.

The capacitive method is a more recent technique that is based on the measurement of the varying electric field produced by the fingerprint ridges. One example of this method is disclosed in U.S. Pat. No. 7,250,774. The sensor is a made using a semiconductor chip. The physical size of the sensor chip is typically at least as large as the area of the fingerprint to be captured. As a result, semiconductor-based sensors cannot be low cost because of the process complexities and the low number of sensors that can be made from a single silicon wafer. Hence, these devices cannot take advantage of the cost reduction curve due to integration that is characteristic of other semiconductor devices (human fingers are not getting smaller). Finally, these semiconductor sensors are made on a rigid substrate that requires a strong and flat surface for mounting in order to prevent the sensor from fracturing. Although most semiconductor sensors are inherently thin, the requirement for a rigid mounting substrate adds to the overall mounting platform thickness. These sensors must also be flat. As a result of these requirements and the cost of the sensor, they are not suitable for use on most hand-held devices, credit and debit cards, and identification badges and cards.

Various semiconductor-based sensors have been developed to use smaller sensor arrays (a small number of sensing lines in one dimension across the sensor) to capture images as the finger is swiped across the sensor that are assembled together create an image of the fingerprint (e.g., U.S. Pat. No. 6,580,816). The sensors require sophisticated processing software/hardware to assemble the individual images together into a complete image of a fingerprint. Although this design addresses the cost issue, it makes the mechanical reliability of this arrangement even worse than the more rigid two-dimensional array. These sensors must also be flat. As a result of these requirements and the cost of the sensor, they are not suitable for use on most hand-held devices, credit and debit cards, and identification badges and cards.

More recently, semiconductor based fingerprint sensors have been manufactured on flexible substrates, using amorphous silicon or other resistive material deposited on top of a variety of substrate materials (e.g., U.S. Pat. No. 6,680,485 and U.S. Published Patent Application No. 20060273417). Some of these devices are active sensors that are costly to manufacture and have high power requirements. Other devices use polymeric transistors that are unreliable in some environmental conditions. U.S. Pat. No. 6,680,485 attempts to address the flexibility and cost constraints required to put fingerprint sensors on hand-held devices, credit and debit cards, and identification badges and cards.

A number of other techniques have been proposed to manufacture electronic fingerprint sensors, although none of these are in widespread use commercially. Some of these techniques include the use of electro-luminescent materials (e.g., U.S. Pat. No. 7,248,298), piezo-electric materials (e.g., U.S. Pat. No. 5,515,738), magneto-resistive materials (e.g., U.S. Pat. No. 7,077,010), and others. These sensors are not suitable for use on hand-held devices, credit and debit cards, and identification badges and cards.

Unlike fingerprint sensors, low resolution pressure sensors have been developed using lower cost sensor elements (e.g., U.S. Pat. Nos. 5,033,291 and 6,964,205) and composite materials (e.g., U.S. Pat. Nos. 4,644,101 and 6,915,701 and 7,059, 203 and 7,080,562 and 7,260,999). These sensors are typically used for pressure responsive input devices (e.g., U.S. Pat. No. 4,644,101), pressure distribution sensors (e.g., U.S. Pat. Nos. 5,033,291 and 6,964,205), and shear force sensors (e.g., U.S. Pat. No. 6,915,701).

U.S. Pat. No. 4,644,101 discloses a position sensor assembly which comprises a composite layer medium including electrically conductive magnetic particles in a nonconductive matrix material. The particles are aligned into chains extending across the thickness of the layer, and the chains include a non-conductive gap which is bridged upon application of sufficient pressure. The medium is sandwiched between sheet electrodes such that electrical measurements can be taken at specific points at the periphery of the sensor to determine where the pressure is being applied. Similarly, U.S. Pat. No. 6,915,701 discloses the use of non-random patterns of conductive particles to form columns having defined orientations in a non-conductive matrix. Although these sensors provide signals that are indicative of the position of a locally applied pressure, it cannot capture an image of a fingerprint.

U.S. Pat. No. 7,059,203 discloses a physical sensor having a pressure sensing layer and electrical insulating layers which are integrally formed on opposite two surfaces of the pressure sensing layer, respectively. The pressure sensing layer has a matrix comprising glass and electrically conductive particles dispersed in the matrix. One pair of electrodes are disposed on opposite sides of the pressure sensing layer such that the electrical resistance of the pressure sensing layer between the electrodes is changed by application of a stress on the electrical insulating layers. Although this sensor provides high precision as to the amount of pressure exerted on the sensor, it cannot capture an image of a fingerprint.

U.S. Pat. No. 7,080,562 discloses a pressure conduction sensor that includes a pair of locally resilient conductive layers and a locally resilient pressure conduction composite disposed between and contacting both conductive layers. The pressure conduction composite is composed of a plurality of conductive particles electrically isolated within a non-conductive matrix. The conductive particles are loaded so as to have a volume fraction approaching the critical percolation threshold of the material system and exhibit a conductance that greatly increases with pressure. Multiple sensors that are insulated from one another can be arranged to form one or more arrays including planar and conformal configurations. Such an array can be used for keypads, switches and intrusion detection systems, but cannot provide the resolution necessary to capture an image of a fingerprint.

U.S. Pat. No. 7,260,999 discloses a force sensing membrane that includes a pair of conductors and a composite material disposed between the conductors for electrically connecting the first and second conductors under application of sufficient pressure there between. The composite material contains conductive particles that have no relative orientation and are at least partially embedded in an elastomeric layer. The conductive particles are large enough in relation to the composite material such that substantially all conduction paths are through single particles, instead of many conductive particles. The sensor cannot capture an image of a fingerprint.

U.S. Pat. Nos. 4,856,993 and 5,033,291 and 6,964,205 disclose pressure sensors containing arrays of individual sensor elements. Each sensor element has a pressure sensitive resistive material disposed between and attached to both of the two electrodes. U.S. Pat. No. 4,856,993 discloses two sets of parallel electrodes which are each formed on a thin flexible supporting sheet. The electrodes are separated by a thin, pressure sensitive resistive coating and the sensor elements are created at the intersection points of the two sets of parallel electrodes. U.S. Pat. No. 5,033,291 also discloses two sets of parallel electrodes separated by a thin, pressure sensitive resistive coating on a thin flexible supporting sheet, but uses adhesive dots to separate the sensor elements from one another. The adhesive dots can be used to vary the sensitivity of the array by increasing/decreasing the number of adhesive dots in an area or by creating a small space between the pressure sensitive resistive materials attached to the two electrodes. The sensors in these two patents are created using a silk screening or printing process. U.S. Pat. No. 6,964,205 uses a complicated design of conductive traces and electrodes to form the sensor elements. All of these devices are designed to provide rather large sensor arrays to measure the pressure distribution between two opposing objects. The stated resolution between contact points for these processes is 0.050 inches or less. Although printing techniques have improved to provide better sensor element density since these patents issued, these processes are likely too expensive at the required resolution for use on hand-held devices, credit and debit cards, and identification badges and cards.

These previous designs do not have all the characteristics necessary for the fingerprint biometric to be employed ubiquitously in society (i.e., low cost, thin, mechanically conforming, mechanically flexible, adequate resolution). Accordingly, there is a need for a fingerprint sensor that is low cost, thin, mechanically conforming, mechanically flexible and provides adequate resolution such that it can be used on hand-held devices, credit and debit cards, identification badges and cards, and the like.

SUMMARY OF THE INVENTION

The present invention provides a fingerprint sensor that is low cost, thin, mechanically conforming, mechanically flexible and provides adequate resolution such that it can be used on hand-held devices, credit and debit cards, identification badges and cards, and the like. This invention discloses a novel method of manufacturing a fingerprint sensor which is mechanically flexible and costs less to manufacture than currently known methods. The sensor includes a compressible and flexible core material layered in between two orthogonally arranged electrical conductive wires. The core material's electrical resistance varies according to applied pressure. The orthogonal wiring arrangement allows an external electronic circuit to successively scan each geometric intersection of the array in order to measure the local resistance. The variation in electrical resistance across the array corresponds to the applied fingerprint's pattern. This invention does not use any active electronic components such as transistors, and does not require the application of any semiconductor manufacturing techniques. As a result, the device consumes significantly lower electrical power per fingerprint image capture operation than other methods. In addition, all of the manufacturing materials and processes required to manufacture the sensor disclosed in this invention are compatible with large-scale low cost and high volume production. Moreover, the device is capable of sustaining mechanical stresses and long term "abuse" in a fault-tolerant manner. As a result, the present invention enables the manufacture of very low-cost fingerprint sensors for incorporation into many day-to-day consumer items such as cell phones, credit cards, purses, wallets, etc.

One embodiment of the present invention provides a flexible pressure sensor having a composite material that includes a first set of conductive particles, a second set of conductive particles and a third set of conductive particles all of which are at least partially embedded in an elastomeric layer that is capable of returning to substantially its original dimensions on release of pressure. The first set of conductive particles are electrically connected to form a first set of substantially parallel conductors within a lower portion of the elastomeric layer in the x direction. The second set of conductive particles are electrically connected to form a second set of substantially parallel conductors within an upper portion of the elastomeric layer in the y direction. The third set of conductive particles have no relative orientation and are disposed within the elastomeric layer for electrically connecting the first set and second set of conductors in the z direction under application of sufficient pressure there between.

Another embodiment of the present invention provides a flexible pressure sensor having a first set of substantially parallel conductors in the x direction, a second set of substantially parallel conductors in the y direction, and a composite material disposed between the first set and second set of conductors. The composite material is capable of returning to substantially its original dimensions on release of pressure. The composite material includes conductive particles at least partially embedded in an elastomeric layer that have no relative orientation and are disposed within the elastomeric layer for electrically connecting the first set and second set of conductors in the z direction under application of sufficient pressure there between.

Yet another embodiment of the present invention provides a flexible pressure sensor having a first set of substantially parallel conductors in the x direction and a composite material in contact with the first set of conductors. The composite material includes a first set of conductive particles and a second set of conductive particles all of which are at least partially embedded in an elastomeric layer that is capable of returning to substantially its original dimensions on release of pressure. The first set of conductive particles are electrically connected to form a second set of substantially parallel conductors within an upper portion of the elastomeric layer in the y direction. The second set of conductive particles have no relative orientation and are disposed within the elastomeric layer for electrically connecting the first set and second set of conductors in the z direction under application of sufficient pressure there between.

Still another embodiment of the present invention provides a flexible fingerprint sensor having a first set of substantially parallel conductors in the x direction attached to, deposited on or placed on a flexible substrate and a composite material in contact with the first set of conductors. The composite material includes a first set of conductive particles and a second set of conductive particles all of which are at least partially embedded in an elastomeric layer that is capable of returning to substantially its original dimensions on release of pressure. The first set of conductive particles are electrically connected to form a second set of substantially parallel conductors within an upper portion of the elastomeric layer in the y direction. The second set of conductive particles have no relative orientation and are disposed within the elastomeric layer for electrically connecting the first set and second set of conductors in the z direction under application of sufficient pressure there between. The conductive particles can be a metal, a core particle having a conductive coating, carbon nanotubes, carbon nanofibers, conductive fibers, or a combination thereof. The first set of conductors and second set of conductors provide a resolution of at least 300 dots per inch and the fingerprint sensor has an overall thickness of less than 0.020 inches.

The flexible pressure sensor can be fabricated by providing a composite material that is capable of returning to substantially its original dimensions on release of pressure. The composite material includes conductive particles at least partially embedded in an elastomeric layer that have no relative orientation and are disposed within the elastomeric layer for electrically connecting a first set and a second set of conductors in the z direction under application of sufficient pressure there between. The first set of substantially parallel conductors in the x direction are provided below or within a lower portion of the composite material. The second set of substantially parallel conductors in the y direction are provided above or within an upper portion of the composite material.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

Figure 1:
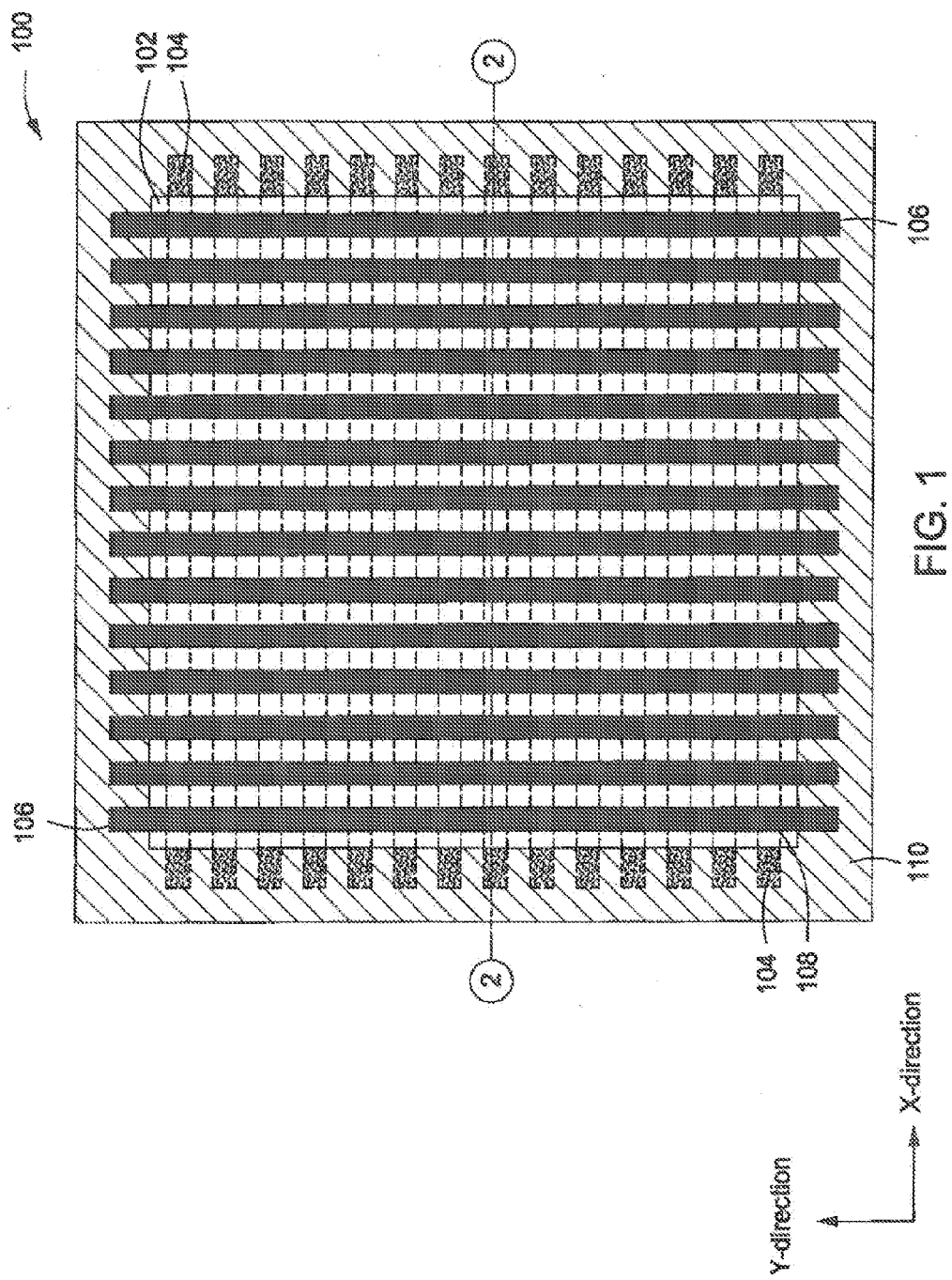
FIG. 1 is a top view of a flexible fingerprint sensor in accordance with a first embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to fingerprint sensors, but it will be understood that the concepts of the present invention are applicable to any medium to high resolution pressure sensor.

In current economic terms, the sensor should cost on the order of $0.25 per unit in volume manufacturing in order to become accepted ubiquitously. The sensor must also be thin, as there is no physical depth available in most consumer products to accommodate thick components. A total system-level thickness (including the mounting platform) should be less than 0.030" and preferably less than 0.020". This thickness is compatible with mounting of the sensor onto a credit card, a cell phone, and numerous other consumer devices. A typical fingerprint sensor requires approximately a 0.5"×0.5" active sensing area in order to accommodate the breadth of human finger sizes, finger alignment to the sensor, varying pressures applied, and a host of human-factors related variables. This is the minimum area requirement, and a larger area will make the sensor system more reliable. Such an area that is flat and rigid is not available on most small, hand-held devices such as cell phones. As a result, the sensor must mechanically conform to the available shape (which is typically curved) of the device to which it is attached. In addition, the sensor, due to its physical size, must be able to physically flex. It is not possible to ensure a rigid mounting base (irrespective of whether that base is itself flat or contoured) and which is also physically inflexible. An example of this requirement is the placement of a fingerprint sensor onto a thin credit card or drivers' license, which bend in someone's wallet, or even on the surface of a purse which itself is not rigid.

The present invention provides a fingerprint sensor that is low cost, thin, mechanically conforming, mechanically flexible and provides adequate resolution such that it can be used on hand-held devices, credit and debit cards, identification badges and cards, and the like. This invention discloses a novel method of manufacturing a fingerprint sensor which is mechanically flexible and costs less to manufacture than currently known methods. The sensor includes a compressible and flexible core material layered in between two orthogonally arranged electrical conductive wires. The core material's electrical resistance varies according to applied pressure. The orthogonal wiring arrangement allows an external electronic circuit to successively scan each geometric intersection of the array in order to measure the local resistance. The variation in electrical resistance across the array corresponds to the applied fingerprint's pattern. This invention does not use any active electronic components such as transistors, and does not require the application of any semiconductor manufacturing techniques. As a result, the device consumes significantly lower electrical power per fingerprint image capture operation than other methods. In addition, all of the manufacturing materials and processes required to manufacture the sensor disclosed in this invention are compatible with large-scale low cost and high volume production. Moreover, the device is capable of sustaining mechanical stresses and long term "abuse" in a fault-tolerant manner. As a result, the present invention enables the manufacture of very low-cost fingerprint sensors for incorporation into many day-to-day consumer items such as cell phones, credit cards, purses, wallets, etc.

Now referring to FIG. 1, a top view of a flexible fingerprint sensor 100 in accordance with a first embodiment of the present invention is shown. A simplified 14×14 array is shown for discussion purposes; however, a practical implementation would have at least 200-300 lines on each side. The fingerprint sensor 100 includes of a series of layers of materials. At the center is a bulk soft, compressible and elastic material, such as a polymer or an elastomer (hereinafter referred to as the base material or composite material 102). The base material or composite material 102 is impregnated with small electrically conductive particles (not shown). In other words, the conductive particles are at least partially embedded in an elastomeric layer. The conductive particles can be metal, core particles having a conductive coating, carbon nanotubes, carbon nanofibers, conductive fibers, or a combination thereof. The conductive particles are distributed homogeneously with no relative orientation within the composite material 102 in a bulk fashion, such as in a melting and mixing process. Composite materials 102 having conductive particles are disclosed in the following U.S. patents, all of which are incorporated by reference in their entirety: U.S. Pat. Nos. 4,644,101; 6,915,701; 7,059,203; 7,080,562; and 7,260,999.

The composite material 102 is made into a thin sheet and cut into fingerprint sensor sizes (typically 0.5"×0.5"). A typical thickness of this film is on the order of 0.010" to 0.030". The density of the conductive materials, as well as the size distribution of these particulates, is made so that in the normal state (when no pressure is applied) of the thin film, the electrical resistance from top to bottom surfaces is large (on the order of one or more Mega-ohms). However, with the application of a small force onto the surface of this impregnated base material, the resistance will drop significantly, due to the pressing of the conductive particulates together forming a current path from top surface to bottom surface. Since the composite material 102 is thin, the deformation in the vertical dimension (the z direction) is small, and thus an adequate resolution in the orthogonal dimensions (where the finger rests onto the sensor, x and y directions) is achievable— enough to sense the individual ridges of human fingers. The required resolution in order to sense the variety of human fingerprints across the worldwide population is approximately 300 dots per inch, or 0.033" in both dimensions.

One mechanism to transfer the resistance change of the composite material 102 to a measurement device (such as a voltage source and a voltage measurement circuit) is achieved by connecting a first set of substantially parallel electrical conductors 104 in the x direction on the bottom or lower portion of the composite material 102, and a second set of substantially parallel electrical conductors 106 in the y direction on the top or upper portion of the composite material 102. The first set of conductors 104 and the second set of conductors 106 form an array or matrix of rows and columns on the top and bottom surfaces of the composite material 102. The geometric intersection of the x and y wires at each point (e.g., 108) allows an external device to measure the vertical resistance (in the z direction) of the composite material 102 at that particular pixel location. A scan of the whole array of resistive elements (each formed at the x and y intersection, at each pixel) provides a complete resistive image of the fingerprint. Typically, the sets of parallel electrical conductors (e.g., 104) can be printed or etched (or otherwise deposited) onto a flexible substrate (e.g., 110) such as a polyimide film. Two of these films can be used orthogonally (one in the x direction and one in the y direction), with the composite material 102 sandwiched in the middle. Note that the upper flexible substrate is not shown. The alignment of the composite material 102 to the x and y wiring layers is not critical, as the impregnation of the conductors into the base material is homogeneous and not patterned. Very gross alignment is sufficient. As a result, eliminating the necessity of creating specific sensor elements within the composite material 102 reduces cost, improves yield, and improves performance and reliability because the sensor points are created wherever the sets of conductors intersect. The sensor can be integrated into a hand-held device, a credit card, a debit card, an identification badge, an identification card, an access card or a passport. Techniques to process or otherwise use the data produced by the sensor are well known and need not be discussed herein.

Figure 2:
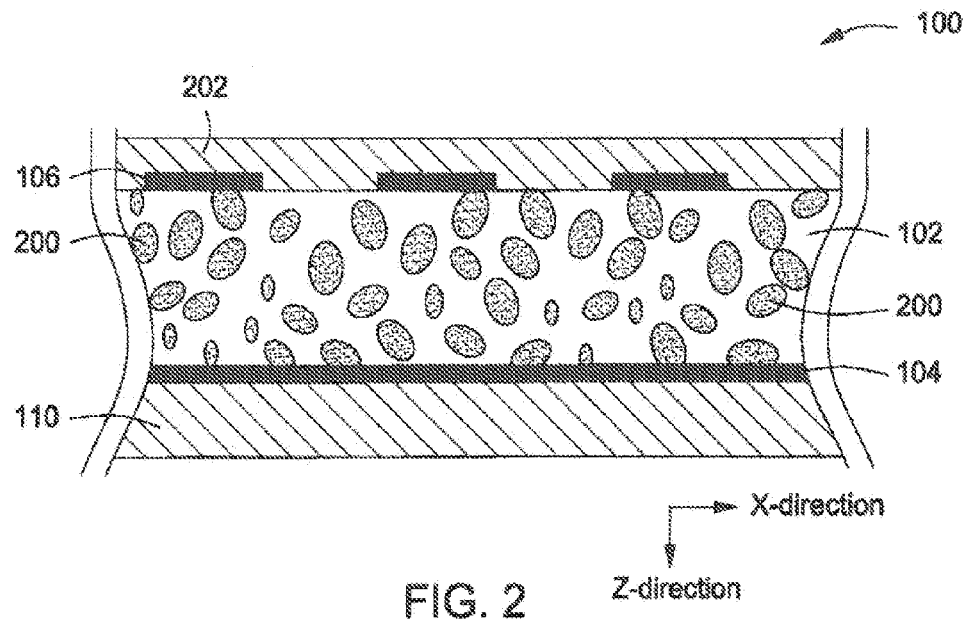
FIG. 2 is a cross sectional view of the flexible fingerprint sensor of FIG. 1.

Referring now to FIG. 2, a cross sectional view of the flexible fingerprint sensor 100 of FIG. 1 is shown. The composite material 102 is disposed between a first set of substantially parallel conductors 104 in the x direction and a second set of substantially parallel conductors 106 in the y direction. The composite material 102 is capable of returning to substantially its original dimensions on release of pressure. The composite material 102 includes conductive particles 200 at least partially embedded in an elastomeric layer that have no relative orientation and are disposed within the elastomeric layer for electrically connecting the first set 104 and second set 106 of conductors in the z direction under application of sufficient pressure there between. Note the conductive particles 200 are typically of small (but not identical) sizes homogeneously suspended in the composite material 102. The first set of parallel conductors 104 are attached to, deposited on or placed on a first (lower) flexible substrate 110. Similarly, the second set of parallel conductors 106 are attached to, deposited on or placed on a second (upper) flexible substrate 202.

Figure 3:
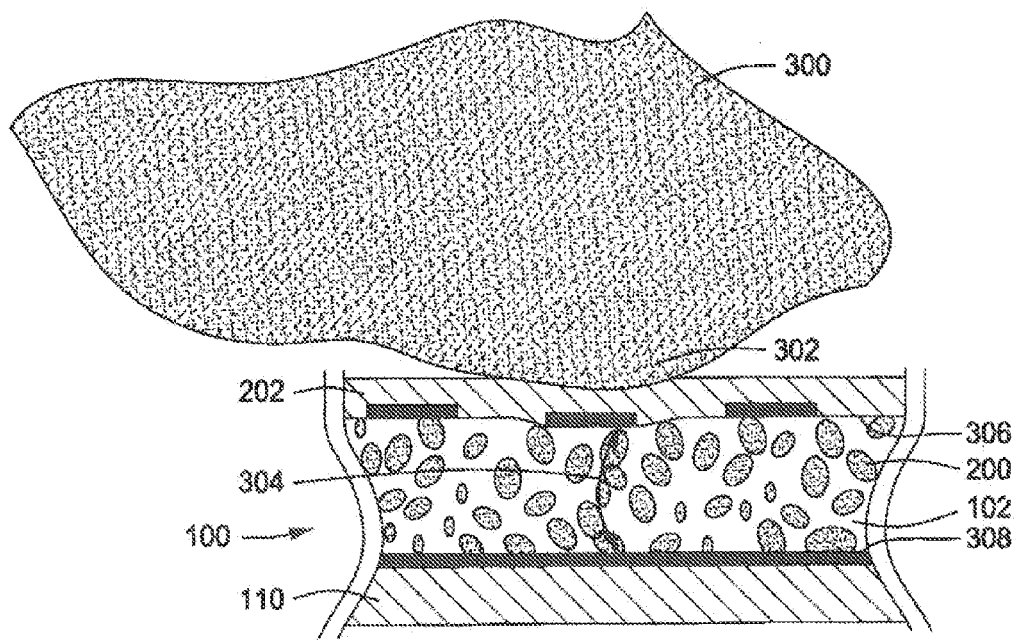
FIG. 3 is a cross sectional view of finger on the flexible fingerprint sensor of FIG. 1.

Now referring to FIG. 3, a cross sectional view of finger 300 on the flexible fingerprint sensor 100 of FIG. 1 is shown. In operation, the second (upper) flexible substrate or membrane 202 bends under pressure from the finger ridge 302, which compresses the composite material 102. The compression causes the conductive particles 200 to mechanically contact, causing a short circuit (denoted by arrow 304) (or at least a drop in electrical resistance) from the top surface 306 to the bottom surface 308. This change in electrical resistance is localized to where the finger ridges 302 are located. These locations are then reflected as low-resistance readings as the rows (x) and columns (y) are scanned in reading and recording their resistance. Since the base material is both flexible and elastomeric (like a rubber ball), it returns to its inert shape (flat and high resistance everywhere) after finger pressure is removed.

Figure 4:
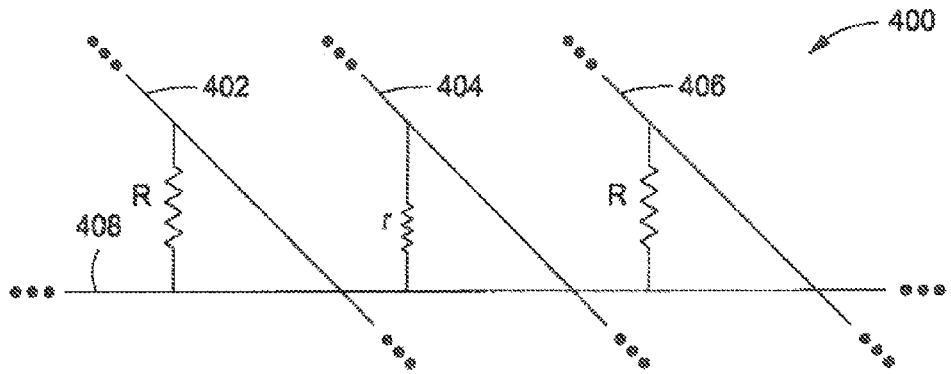
FIG. 4 is an equivalent electrical circuit of the flexible fingerprint sensor of FIG. 1.

Referring now to FIG. 4, an equivalent electrical circuit 400 of the flexible fingerprint sensor 100 of FIG. 1 is shown. The electrical circuit 400 shows three pixels 402, 404 and 406 on the same row 408. The middle pixel 404 is compressed by a finger ridge causing its electrical resistance from (R) to drop to (r). The two adjacent pixels 402 and 406 are not compressed, so their resistance (R) remains high. These adjacent pixels' resistance might drop a little due to their being adjacent to the pressure point, but there is still discernable differential in resistance to indicate the center point of the ridge maximum pressure (and thus the location of the ridge). Note that these three pixels 402, 404 and 406 share one common electrical node 408 (the bottom trace), but are isolated in their upper nodes. In this manner, it is possible to electrically read each resistor's value individually. When no finger is pushing against the sensor, all resistors are at a high value (R). When a finger is pressed onto the sensor, the ridges of the finger will create a greater pressure onto their respective x-y locations, causing these locations to exhibit a lower resistance (r). Thus the physical fingerprint ridges are converted into a set of resistance values in the x-y dimensions which are digitized for further image processing.

Figure 5:
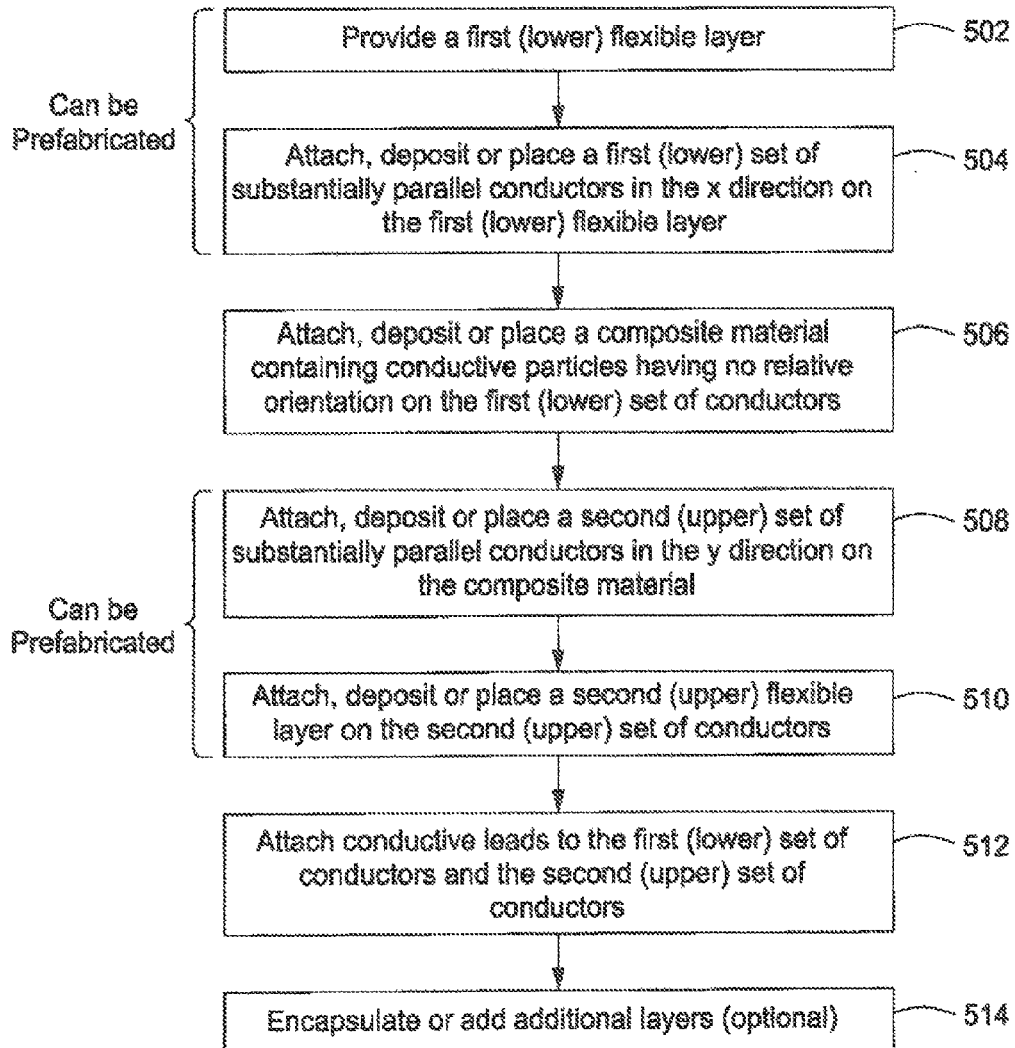
FIG. 5 is a flow chart showing a method for fabricating the flexible fingerprint sensor of FIG. 1.

Now referring to FIG. 5, a flow chart showing a method 500 for fabricating the flexible fingerprint sensor 100 of FIG. 1 is shown. The flexible pressure sensor 100 can be fabricated by providing a first (lower) flexible substrate or layer 110 in block 502 and attaching, depositing or placing a first (lower) set of substantially parallel conductors 104 in the x direction on the first (lower) flexible layer 110 in block 504. A composite material 102 that is capable of returning to substantially its original dimensions on release of pressure is attached, deposited or placed on the first (lower) set of conductors 104 in block 506. The composite material 102 includes conductive particles at least partially embedded in an elastomeric layer that have no relative orientation and are disposed within the elastomeric layer for electrically connecting the first set 104 and the second set 106 of conductors in the z direction under application of sufficient pressure there between. A second (upper) set of substantially parallel conductors 106 in the y direction are attached, deposited or placed on the composite material 102 in block 508. A second (upper) flexible substrate or layer 202 is then attached, deposited or placed on the second (upper) set of conductors 106 in block 510. Note that steps 502 and 504 (likewise 508 and 510) can be combined such that the flexible layer and electrical conductors can be prefabricated. Conductive leads are then attached to the first set of conductors 104 and the second set of conductors 106 in block 512. Additional steps may also be preformed, such as: providing one or more additional layers 514; encapsulating the sensor in a package 514; or integrating the sensor into a hand-held device, a credit card, a debit card, an identification badge, an identification card, an access card or a passport.

Figure 6:
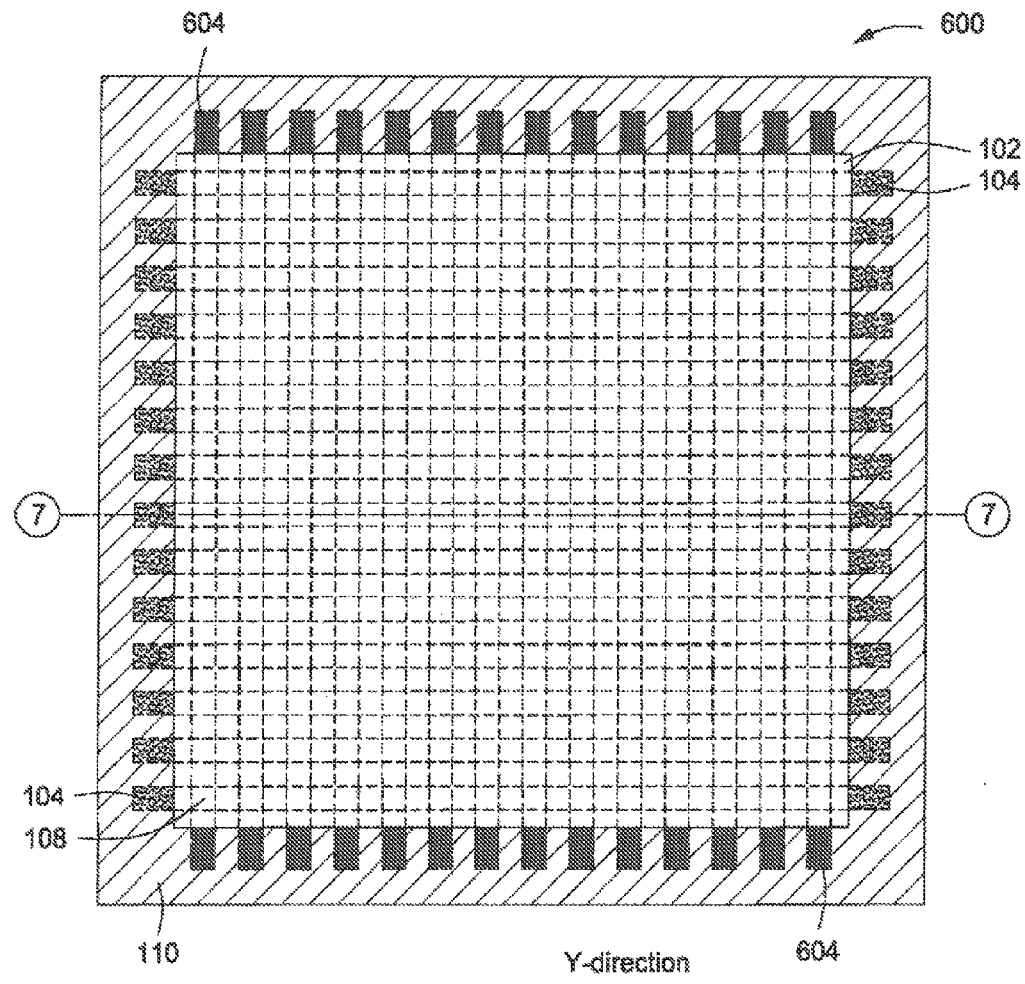
FIG. 6 is a top view of a flexible fingerprint sensor in accordance with a second embodiment of the present invention.
Figure 7:
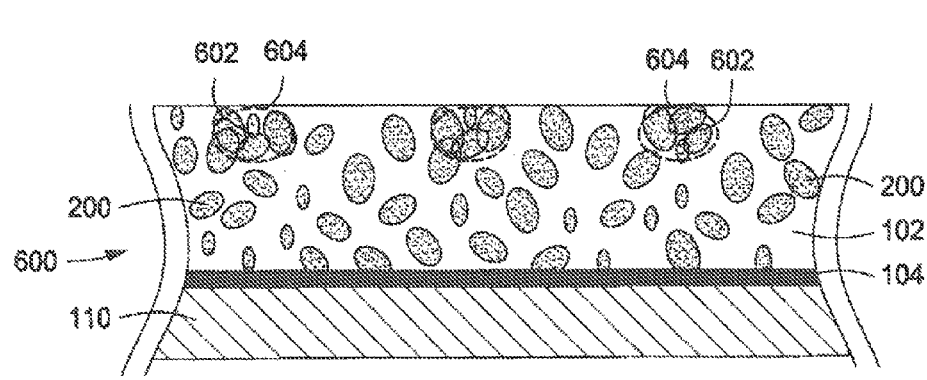
FIG. 7 is a cross sectional view of the flexible fingerprint sensor of FIG. 6.

Referring now to FIGS. 6 and 7, a top view (FIG. 6) and a cross section view (FIG. 7) of a flexible fingerprint sensor 600 in accordance with a second embodiment of the present invention are shown. In this embodiment, it is possible to eliminate the top-most layer of conductor carrying material. This is useful in order to further increase the spatial resolution of the sensor by eliminating any special buffering that this top layer exhibits. The column (y-direction) conductors are still required in order for the electrical scanning circuit to be completed. The flexible pressure sensor 600 has a first set of substantially parallel conductors 104 in the x direction and a composite material 102 in contact with the first set of conductors 104. The composite material 102 includes a first set of conductive particles 602 and a second set of conductive particles 200 all of which are at least partially embedded in an elastomeric layer that is capable of returning to substantially its original dimensions on release of pressure. The first set of conductive particles 602 are electrically connected to form a second set of substantially parallel conductors 604 within an upper portion of the elastomeric layer in the y direction. Note that the second set of conductors 602 can be semi-conductive or partially conductive as along as a change in resistance can be detected when a finger presses on the sensor. The second set of conductors 602 can be formed using a laser beam or other directed heat source which scans above the material in the y-direction, causing localized melting and recombination of these particulates into a series of electrically conductive lines. It is important that the depth of the recombination in forming this conductive line not be too deep and make contact to the row conductors, as a vertical short circuit is made. The second set of conductive particles 200 have no relative orientation and are disposed within the elastomeric layer for electrically connecting the first set 104 and second set 604 of conductors in the z direction under application of sufficient pressure there between. The flexible pressure sensor 600 may include one or more additional layers (e.g., 110) that provide protection against contamination or physical damage, adhesion, a mechanical mounting structure, a flexible substrate or a combination thereof. The composite material 102 can also be encapsulated in a protective material having a first set of conductive leads electrically connected to the first set of conductors 104 that extend through the protective material and a second set of conductive leads electrically connected to the second set of conductors 604 that extend through the protective material.

Figure 8:
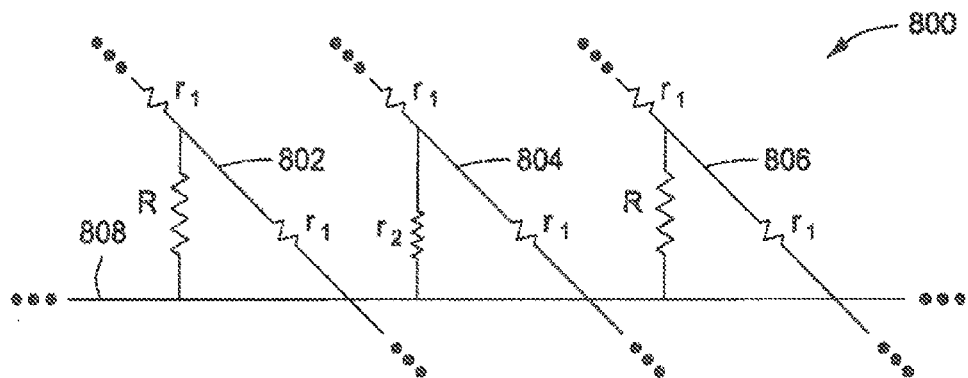
FIG. 8 is an equivalent electrical circuit of the flexible fingerprint sensor of FIG. 6.

Referring now to FIG. 8, an equivalent electrical circuit of the flexible fingerprint sensor 600 of FIG. 6 is shown. The electrical circuit 800 shows three pixels 802, 804 and 806 on the same row 808. Since the second set of conductors 604 are created from the conductive particles, the resistance (r1) of these conductors will be higher than the resistance of the first set of conductors (e.g., 808). The cumulative resistance (r1+ r2) needs to be sufficiently lower than (r1+R) so that the change can be detected. The middle pixel 804 is compressed by a finger ridge causing its electrical resistance to drop from (R) to (r2). The two adjacent pixels 802 and 806 are not compressed, so their resistance (R) remains high. These adjacent pixels' resistance might drop a little due to their being adjacent to the pressure point, but there is still discernable differential in resistance to indicate the center point of the ridge maximum pressure (and thus the location of the ridge). Note that these three pixels 802, 804 and 806 share one common electrical node 808 (the bottom trace), but are isolated in their upper nodes. In this manner, it is possible to electrically read each resistor's value individually. When no finger is pushing against the sensor, all resistors are at a high value (R). When a finger is pressed onto the sensor, the ridges of the finger will create a greater pressure onto their respective x-y locations, causing these locations to exhibit a lower resistance (r2). Thus the physical fingerprint ridges are converted into a set of resistance values in the x-y dimensions which are digitized for further image processing.

Figure 9:
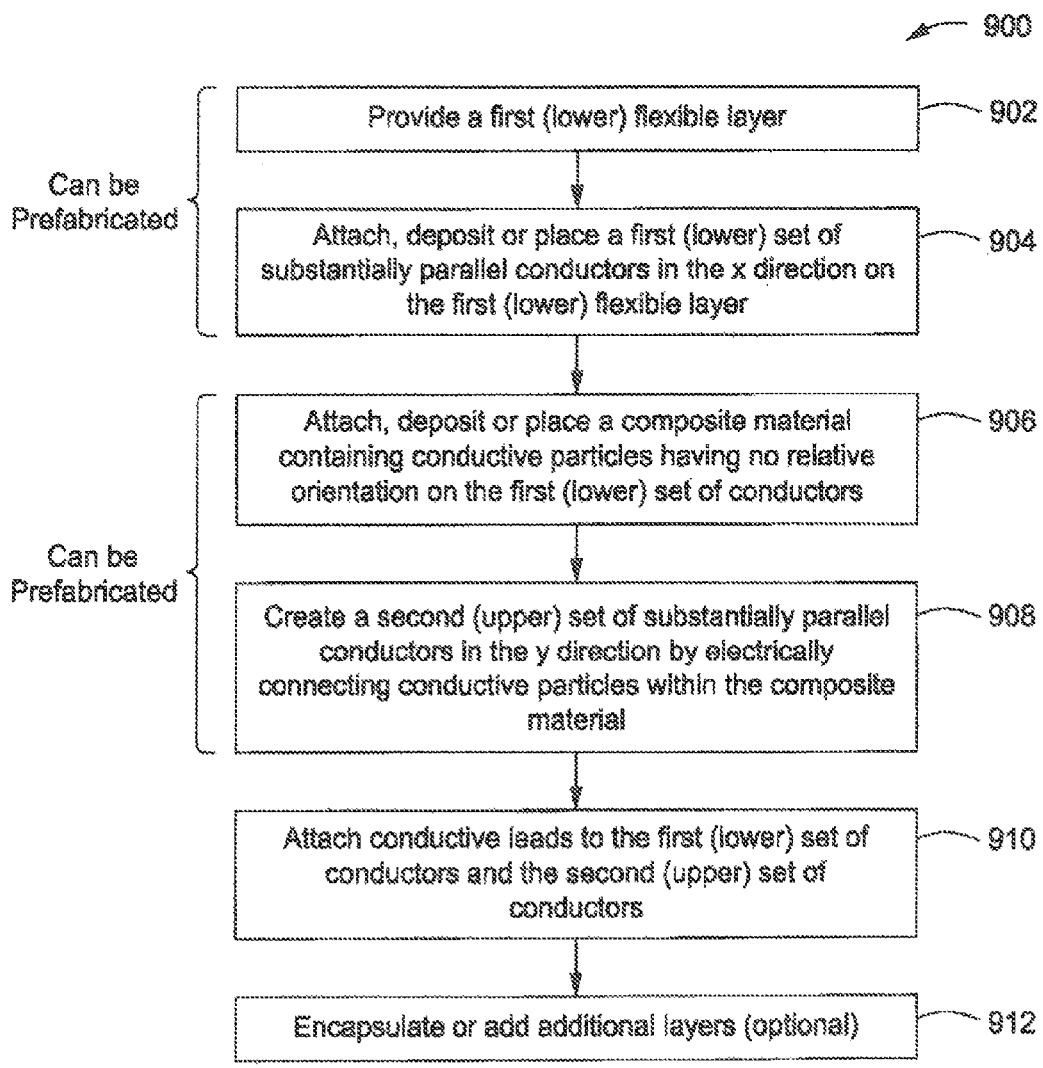
FIG. 9 is a flow chart showing a method for fabricating the flexible fingerprint sensor of FIG. 6.

Now referring to FIG. 9, a flow chart showing a method 900 for fabricating the flexible fingerprint sensor 600 of FIG. 6 is shown. The flexible pressure sensor 600 can be fabricated by providing a first (lower) flexible substrate or layer 110 in block 902 and attaching, depositing or placing a first (lower) set of substantially parallel conductors 104 in the x direction on the first (lower) flexible layer 110 in block 904. A composite material 102 that is capable of returning to substantially its original dimensions on release of pressure is attached, deposited or placed on the first (lower) set of conductors 104 in block 906. The composite material 102 includes conductive particles at least partially embedded in an elastomeric layer that have no relative orientation and are disposed within the elastomeric layer for electrically connecting the first set 104 and the second set 604 of conductors in the z direction under application of sufficient pressure there between. A second (upper) set of substantially parallel conductors 604 in the y direction are created by electrically connecting conductive particles 602 within the composite material 102 in block 908. Note that steps 902 and 904 can be combined such that the flexible layer and electrical conductors can be prefabricated. Similarly, steps 906 and 908 can be combined such that the electrical conductors within the composite material can be prefabricated. Conductive leads are then attached to the first set of conductors 104 and the second set of conductors 604 in block 910. Additional steps may also be preformed, such as: providing one or more additional layers 912; encapsulating the sensor in a package 912; or integrating the sensor into a hand-held device, a credit card, a debit card, an identification badge, an identification card, an access card or a passport.

Figure 10:
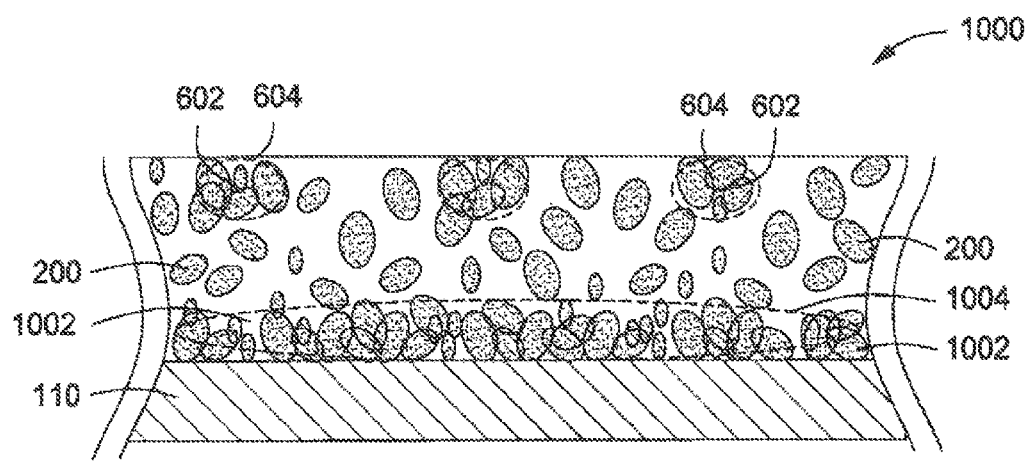
FIG. 10 is a cross sectional view of a flexible fingerprint sensor in accordance with a third embodiment of the present invention.

Referring now to FIG. 10, a cross sectional view of a flexible fingerprint sensor 1000 in accordance with a third embodiment of the present invention is shown. The flexible pressure sensor 1000 has a composite material 102 that includes a first set of conductive particles 1002, a second set of conductive particles 602 and a third set of conductive particles 200 all of which are at least partially embedded in an elastomeric layer that is capable of returning to substantially its original dimensions on release of pressure. The first set of conductive particles 1002 are electrically connected to form a first set of substantially parallel conductors 1004 within a lower portion of the elastomeric layer in the x direction. The second set of conductive particles 602 are electrically connected to form a second set of substantially parallel conductors 604 within an upper portion of the elastomeric layer in the y direction. The third set of conductive particles 200 have no relative orientation and are disposed within the elastomeric layer for electrically connecting the first set 1004 and second set 604 of conductors in the z direction under application of sufficient pressure there between. The flexible pressure sensor 1000 may include one or more additional layers (e.g., 110) that provide protection against contamination or physical damage, adhesion, a mechanical mounting structure, a flexible substrate or a combination thereof. The composite material 102 can also be encapsulated in a protective material having a first set of conductive leads electrically connected to the first set of conductors 1004 that extend through the protective material and a second set of conductive leads electrically connected to the second set of conductors 604 that extend through the protective material.

Figure 11:
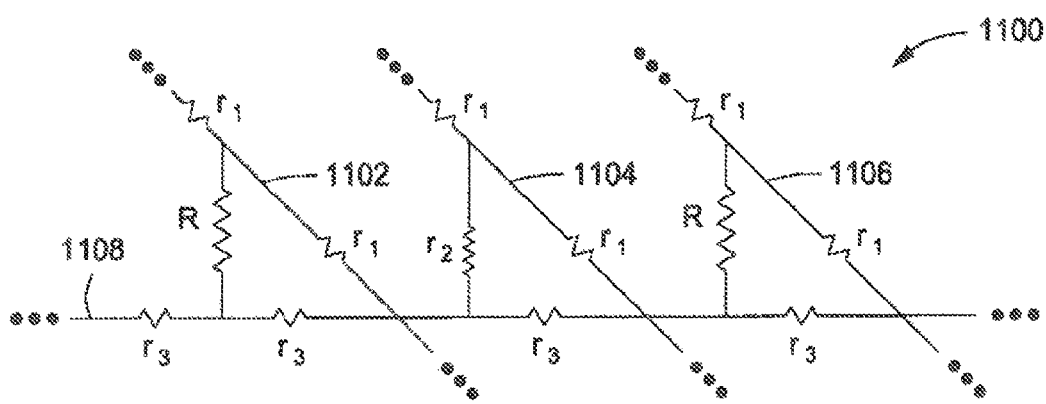
FIG. 11 is an equivalent electrical circuit of the flexible fingerprint sensor of FIG. 10.

Now referring to FIG. 11, an equivalent electrical circuit of the flexible fingerprint sensor 1000 of FIG. 10 is shown. The electrical circuit 1100 shows three pixels 1102, 1104 and 1106 on the same row 1108. The first set of conductors are created from conductive particles 1002 and have a resistance (r3). The second set of conductors 604 are created from conductive particles 602 and have a resistance (r1). The cumulative resistance (r1+r2+r3) needs to be sufficiently lower than (r1+R+r3) so that the change can be detected. The middle pixel 1104 is compressed by a finger ridge causing its electrical resistance to drop from (R) to (r2). The two adjacent pixels 1102 and 1106 are not compressed, so their resistance (R) remains high. These adjacent pixels' resistance might drop a little due to their being adjacent to the pressure point, but there is still discernable differential in resistance to indicate the center point of the ridge maximum pressure (and thus the location of the ridge). Note that these three pixels 1102, 1104 and 1106 share one common electrical node 1108 (the bottom trace), but are isolated in their upper nodes. In this manner, it is possible to electrically read each resistor's value individually. When no finger is pushing against the sensor, all resistors are at a high value (R). When a finger is pressed onto the sensor, the ridges of the finger will create a greater pressure onto their respective x-y locations, causing these locations to exhibit a lower resistance (r2). Thus the physical fingerprint ridges are converted into a set of resistance values in the x-y dimensions which are digitized for further image processing.

Figure 12:
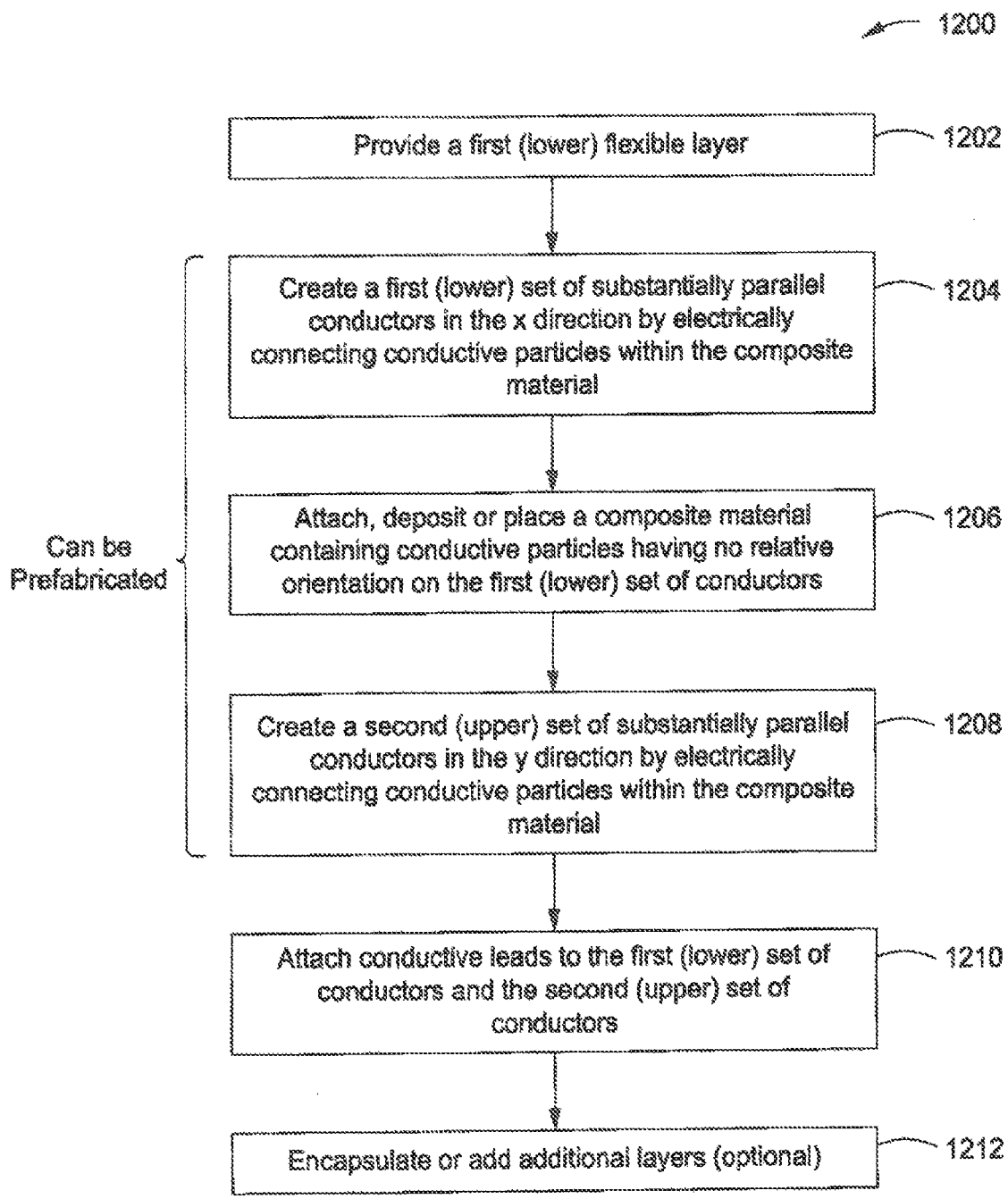
FIG. 12 is a flow chart showing a method for fabricating the flexible fingerprint sensor of FIG. 10.

Referring now to FIG. 12, a flow chart showing a method 1200 for fabricating the flexible fingerprint sensor 1000 of FIG. 10 is shown. The flexible pressure sensor 1000 can be fabricated by providing a first (lower) flexible substrate or layer 110 in block 1202. A first (lower) set of substantially parallel conductors 1004 in the y direction are created by electrically connecting conductive particles 1002 within the composite material 102 in block 1204. A composite material 102 that is capable of returning to substantially its original dimensions on release of pressure is attached, deposited or placed on the first (lower) flexible substrate 110 in block 1206. The composite material 102 includes conductive particles at least partially embedded in an elastomeric layer that have no relative orientation and are disposed within the elastomeric layer for electrically connecting the first set 1004 and the second set 604 of conductors in the z direction under application of sufficient pressure there between. A second (upper) set of substantially parallel conductors 604 in the y direction are created by electrically connecting conductive particles 602 within the composite material 102 in block 1208. Note that steps 1204 and 1206 can be combined such that the both sets of electrical conductors can be prefabricated in the composite material 102. Conductive leads are then attached to the first set of conductors 1004 and the second set of conductors 604 in block 1210. Additional steps may also be preformed, such as: providing one or more additional layers 1212; encapsulating the sensor in a package 1212; or integrating the sensor into a hand-held device, a credit card, a debit card, an identification badge, an identification card, an access card or a passport.

Figure 13:
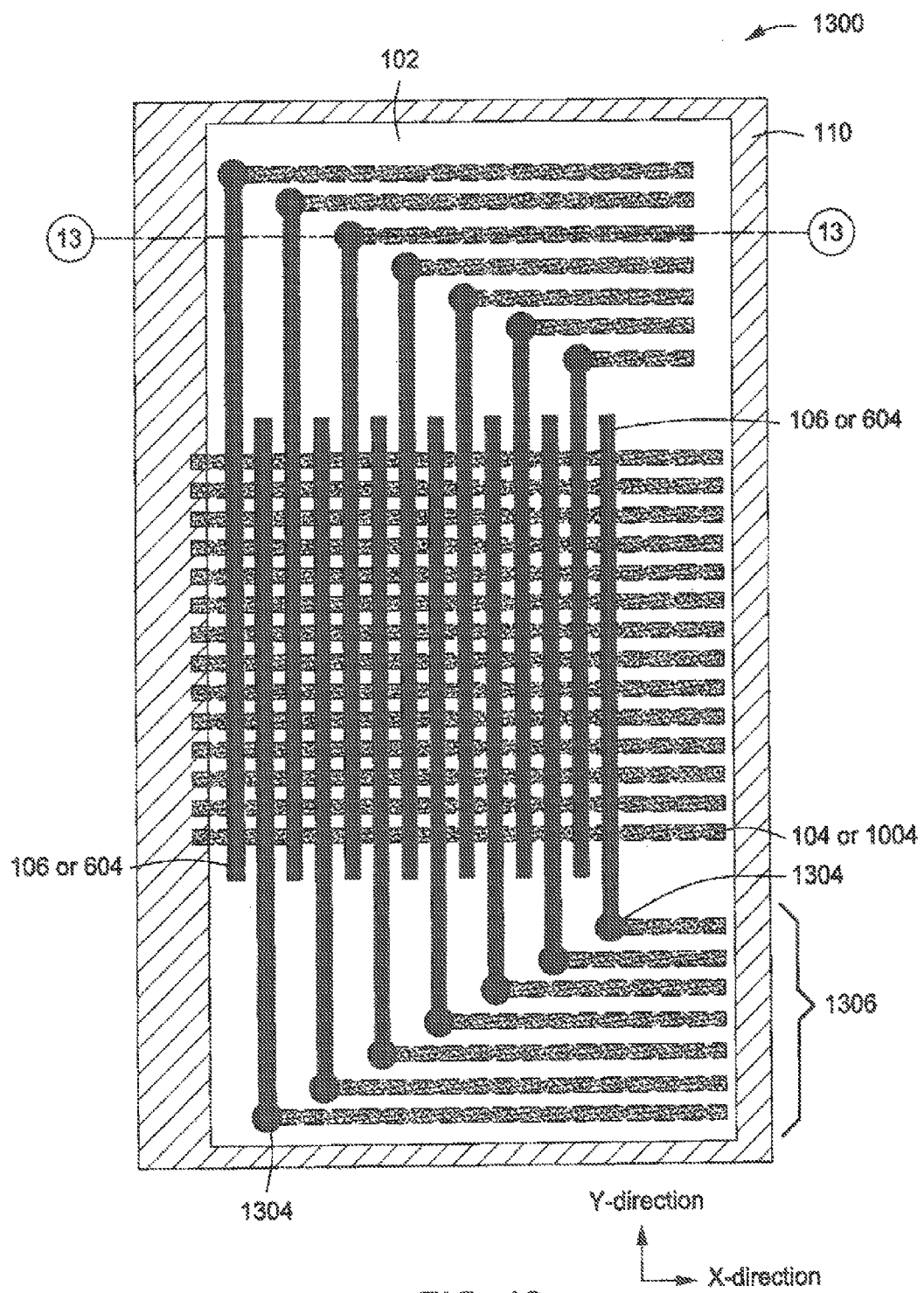
FIG. 13 is a top view of a flexible fingerprint sensor in accordance with a fourth embodiment of the present invention.
Figure 14:
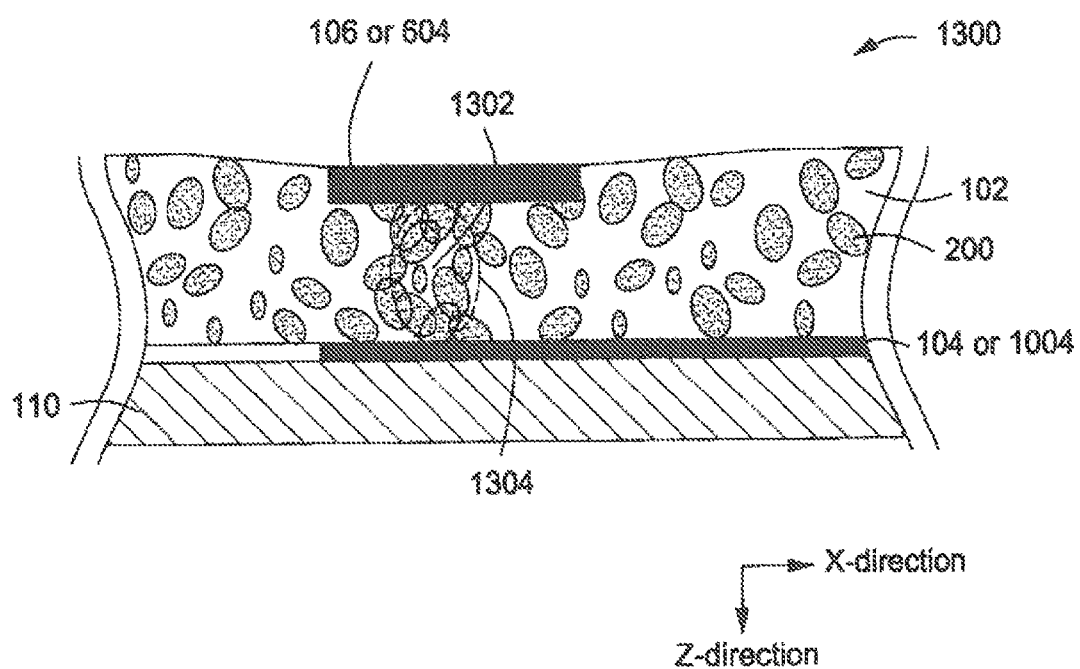
FIG. 14 is a cross sectional view of the flexible fingerprint sensor of FIG. 13.

Now referring to FIGS. 13 and 14, a top view (FIG. 13) and a cross sectional view (FIG. 14) of a flexible fingerprint sensor 1300 in accordance with a fourth embodiment of the present invention is shown. In this embodiment, the flexible pressure sensor 1300 has a first set of substantially parallel conductors 104 or 1004 in the x direction and a composite material 102 in contact with the first set of conductors 104 or 1004. The composite material 102 includes a first set of conductive particles 200 and a fourth set of conductive particles 1302 all of which are at least partially embedded in an elastomeric layer that is capable of returning to substantially its original dimensions on release of pressure. The fourth set of conductive particles 1302 are electrically connected to form a third set of substantially parallel conductors 1304 (similar to vias) in the z direction to connect the second set of conductors 106 or 604 to a set of conductive leads 1306 within or attached to the lower portion of the elastomeric layer. Note that the third set of conductors 1302 can be semi-conductive or partially conductive as along as a change in resistance can be detected when a finger presses on the sensor. The third set of conductors 1304 can be formed using a laser beam or other directed heat source which scans the material in the z-direction, causing localized melting and recombination of these particulates into a series of electrically conductive lines. The second set of conductive particles 200 have no relative orientation and are disposed within the elastomeric layer for electrically connecting the first set 104 or 1004 and second set 106 or 604 of conductors in the z direction under application of sufficient pressure there between. The flexible pressure sensor 1300 may include one or more additional layers (e.g., 110) that provide protection against contamination or physical damage, adhesion, a mechanical mounting structure, a flexible substrate or a combination thereof. The composite material 102 can also be encapsulated in a protective material having a first set of conductive leads electrically connected to the first set of conductors 104 or 1004 that extend through the protective material and a second set of conductive leads electrically connected to the third set of conductors 1306 that extend through the protective material.

Although preferred embodiments of the present invention have been described in detail, it will be understood by those skilled in the art that various modifications can be made therein without departing from the spirit and scope of the invention as set forth in the appended claims.

What is claimed is:

1. A flexible pressure sensor comprising:
   a single elastomeric layer having a top, a bottom, a lower portion above the bottom, an upper portion below the top, and a middle portion between the lower portion and the upper portion, wherein the single elastomeric layer is capable of returning to substantially its original dimensions on release of pressure;
   a plurality of non-oriented conductive particles distributed homogeneously with no relative orientation between the top and bottom of the single elastomeric layer;
   a first set of the non-oriented conductive particles within the single elastomeric layer that have been combined together to form a first set of substantially parallel conductors disposed within the lower portion of the single elastomeric layer above the bottom of the single elastomeric layer in the x direction;
   a second set of the non-oriented conductive particles within the single elastomeric layer that have been combined together to form a second set of substantially parallel conductors disposed within the upper portion of the single elastomeric layer below the top of the single elastomeric layer in the y direction; and
   wherein the non-oriented conductive particles disposed within the single elastomeric layer electrically connect the first set and second set of conductors in the z direction under application of sufficient pressure that reduces an electrical resistance of the single elastomeric layer there between.

2. The flexible pressure sensor as recited in claim 1, further comprising:
   a first layer disposed above the top of the single elastomeric layer; or
   a second layer disposed below the bottom of the single elastomeric layer.

3. The flexible pressure sensor as recited in claim 2, wherein the first and second layers provide protection against contamination or physical damage, adhesion, a mechanical mounting structure, a flexible substrate or a combination thereof.

4. The flexible pressure sensor as recited in claim 1, wherein the single elastomeric layer is encapsulated in a protective material having a first set of conductive leads electrically connected to the first set of conductors that extend through the protective material and a second set of conductive leads electrically connected to the second set of conductors that extend through the protective material.

5. The flexible pressure sensor as recited in claim 1, further comprising a third set of the non-oriented conductive particles within the single elastomeric layer that have been combined together to form a third set of substantially parallel conductors disposed within the lower portion, the middle portion and the upper portion of the single elastomeric layer in the z direction between the top and the bottom of the single elastomeric layer to permanently connect the second set of conductors to a set of conductive leads within or attached to the lower portion of the single elastomeric layer.

6. The flexible pressure sensor as recited in claim 1, wherein the flexible pressure sensor is a fingerprint sensor.

7. The flexible pressure sensor as recited in claim 1, wherein the flexible pressure sensor has an overall thickness of less than 0.030 inches.

8. The flexible pressure sensor as recited in claim 1, wherein the flexible pressure sensor has an overall thickness of less than 0.020 inches.

9. The flexible pressure sensor as recited in claim 1, wherein the first set of conductors and second set of conductors provide a resolution of at least 200 dots per inch.

10. The flexible pressure sensor as recited in claim 1, wherein the first set of conductors and second set of conductors provide a resolution of at least 300 dots per inch.

11. The flexible pressure sensor as recited in claim 1, wherein the conductive particles comprise a metal, a core particle having a conductive coating, carbon nanotubes, carbon nanofibers, conductive fibers, or a combination thereof.

12. The flexible pressure sensor as recited in claim 1, wherein the sensor is integrated into a hand-held device, a credit card, a debit card, an identification badge, an identification card, an access card or a passport.

13. A flexible pressure sensor comprising:
   a first set of substantially parallel conductors in the x direction;
   a single elastomeric layer having a top and a bottom such that the bottom of the single elastomeric layer is in contact with the first set of conductors, wherein the single elastomeric layer: (a) has a lower portion above the bottom, an upper portion below the top, and a middle portion between the lower portion and the upper portion, (b) is capable of returning to substantially its original dimensions on release of pressure and (c) comprises a plurality of non-oriented conductive particles distributed homogeneously with no relative orientation between the top and the bottom of the single elastomeric layer;

a first set of the non-oriented conductive particles within the single elastomeric layer that have been combined together to form a second set of substantially parallel conductors disposed within the upper portion of the single elastomeric layer below the top of the single elastomeric layer in the y direction; and wherein the non-oriented conductive particles disposed within the single elastomeric layer electrically connect the first set and second set of conductors in the z direction under application of sufficient pressure that reduces an electrical resistance of the single elastomeric layer there between.

14. The flexible pressure sensor as recited in claim 13, further comprising one or more additional layers that provide protection against contamination or physical damage, adhesion, a mechanical mounting structure, a flexible substrate or a combination thereof.

15. The flexible pressure sensor as recited in claim 13, wherein the single elastomeric layer is encapsulated in a protective material having a first set of conductive leads electrically connected to the first set of conductors that extend through the protective material and a second set of conductive leads electrically connected to the second set of conductors that extend through the protective material.

16. The flexible pressure sensor as recited in claim 13, further comprising a second set of the non-oriented conductive particles within the single elastomeric layer that have been combined together to form a third set of substantially parallel conductors disposed within the lower portion, the middle portion and the upper portion of the single elastomeric layer in the z direction between the top and the bottom of the single elastomeric layer to connect the second set of conductors to a set of conductive leads within or attached to the lower portion of the single elastomeric layer.

17. The flexible pressure sensor as recited in claim 13, wherein the flexible pressure sensor is a fingerprint sensor.

18. The flexible pressure sensor as recited in claim 13, wherein the flexible pressure sensor has an overall thickness of less than 0.030 inches.

19. The flexible pressure sensor as recited in claim 13, wherein the flexible pressure sensor has an overall thickness of less than 0.020 inches.

20. The flexible pressure sensor as recited in claim 13, wherein the first set of conductors and second set of conductors provide a resolution of at least 200 dots per inch.

21. The flexible pressure sensor as recited in claim 13, wherein the first set of conductors and second set of conductors provide a resolution of at least 300 dots per inch.

22. The flexible pressure sensor as recited in claim 13, wherein the conductive particles comprise a metal, a core particle having a conductive coating, carbon nanotubes, carbon nanofibers, conductive fibers, or a combination thereof.

23. The flexible pressure sensor as recited in claim 13, wherein the sensor is integrated into a hand-held device, a credit card, a debit card, an identification badge, an identification card, an access card or a passport.

24. A flexible fingerprint sensor comprising:
a first set of substantially parallel conductors in the x direction attached to, deposited on or placed on a flexible substrate;

a single elastomeric layer having a top and a bottom such that the bottom of the single elastomeric layer is in contact with the first set of conductors, wherein the single elastomeric layer: (a) has a lower portion above the bottom, an upper portion below the top, and a middle portion between the lower portion and the upper portion, (b) is capable of returning to substantially its original dimensions on release of pressure and (c) comprises a plurality of non-oriented conductive particles distributed homogeneously with no relative orientation between the top and the bottom of the single elastomeric layer;

a first set of the non-oriented conductive particles within the single elastomeric layer that have been combined together to form a second set of substantially parallel conductors disposed within the upper portion of the single elastomeric layer below the top of the single elastomeric layer in the y direction; and wherein the non-oriented conductive particles disposed within the single elastomeric layer electrically connect the first set and second set of conductors in the z direction under application of sufficient pressure that reduces an electrical resistance of the single elastomeric layer there between.

25. The flexible fingerprint sensor as recited in claim 24, wherein the conductive particles comprise a metal, a core particle having a conductive coating, carbon nanotubes, carbon nanofibers, conductive fibers, or a combination thereof.

26. The flexible fingerprint sensor as recited in claim 24, wherein the flexible pressure sensor has an overall thickness of less than 0.030 inches.

27. The flexible fingerprint sensor as recited in claim 24, wherein the flexible pressure sensor has an overall thickness of less than 0.020 inches.

28. The flexible fingerprint sensor as recited in claim 24, wherein the first set of conductors and second set of conductors provide a resolution of at least 200 dots per inch.

29. The flexible fingerprint sensor as recited in claim 24, wherein the first set of conductors and second set of conductors provide a resolution of at least 300 dots per inch.

30. The flexible fingerprint sensor as recited in claim 24, wherein the sensor is integrated into a hand-held device, a credit card, a debit card, an identification badge, an identification card, an access card or a passport.

31. The flexible fingerprint sensor as recited in claim 24, further comprising a second set of the non-oriented conductive particles within the single elastomeric layer that have been combined together to form a third set of substantially parallel conductors disposed within the lower portion, the middle portion and the upper portion of the single elastomeric layer in the z direction between the top and the bottom of the single elastomeric layer to connect the second set of conductors to a set of conductive leads within or attached to the lower portion of the single elastomeric layer.

32. A method for fabricating a flexible pressure sensor comprising the steps of:
providing a single elastomeric layer having a top, a bottom, a lower portion above the bottom, an upper portion below the top, and a middle portion between the lower portion and the upper portion, wherein the single elastomeric layer is capable of returning to substantially its original dimensions on release of pressure and comprises a plurality of non-oriented conductive particles distributed homogeneously with no relative orientation between the top and the bottom of the single elastomeric layer;

creating a first set of substantially parallel conductors within the single elastomeric layer in the x direction disposed within the lower portion of the single elastomeric layer above the bottom of the single elastomeric layer using only the non oriented conductive particles by localized melting and recombination of a first set of the non-oriented conductive particles at least partially embedded in the lower portion of the elastomeric layer in the x direction;

creating a second set of substantially parallel conductors within the single elastomeric layer in the y direction disposed within the upper portion of the single elastomeric layer below the top of the single elastomeric layer using only the non oriented conductive particles by localized melting and recombination of a second set of the non-oriented conductive particles at least partially embedded in the upper portion of the elastomeric layer in the y direction; and wherein the non-oriented conductive particles embedded in the elastomeric layer electrically connect the first set conductors to the second set of conductors in the z direction under application of sufficient pressure that reduces an electrical resistance of the single elastomeric layer there between.

33. The method as recited in claim 32, wherein the flexible pressure sensor is a fingerprint sensor.

34. The method as recited in claim 32, wherein the flexible pressure sensor has an overall thickness of less than 0.030 inches.

35. The method as recited in claim 32, wherein the flexible pressure sensor has an overall thickness of less than 0.020 inches.

36. The method as recited in claim 32, wherein the first set of conductors and second set of conductors provide a resolution of at least 200 dots per inch.

37. The method as recited in claim 32, wherein the first set of conductors and second set of conductors provide a resolution of at least 300 dots per inch.

38. The method as recited in claim 32, wherein the conductive particles comprise a metal, a core particle having a conductive coating, carbon nanotubes, carbon nanofibers, conductive fibers, or a combination thereof.

39. The method as recited in claim 32, further comprising the step of integrating the flexible pressure sensor into a hand-held device, a credit card, a debit card, an identification badge, an identification card, an access card or a passport.

40. The method as recited in claim 32, wherein the first and second set of parallel conductors are semi-conductive or partially conductive.

41. The method as recited in claim 32, further comprising the step of creating a third set of substantially parallel conductors within the single elastomeric layer in the z direction between the top and the bottom of the single elastomeric layer by electrically connecting a fourth set of conductive particles within the lower portion, the middle portion and the upper portion of the single elastomeric layer between the second set of conductors and a set of conductive leads within or attached to the lower portion of the elastomeric layer by localized melting and permanent recombination of the fourth set of conductive particles.

42. The method as recited in claim 32, further comprising the step of attaching conductive leads to the first set of conductors and the second set of conductors.

43. The method as recited in claim 22, further comprising the step of providing one or more additional layers.

44. The method as recited in claim 32, further comprising the step of encapsulating the sensor in a package.

* * * * *